March 30, 1943.  D. S. ROGERS  2,315,225

HOSE COUPLING

Filed Nov. 8, 1941

Inventor:
Donald S. Rogers
By
Attorney

Patented Mar. 30, 1943

2,315,225

UNITED STATES PATENT OFFICE 2,315,225

HOSE COUPLING

Donald S. Rogers, Edgewater, Colo., assignor of one-half to Lloyd Quigley, Pueblo, Colo.

Application November 8, 1941, Serial No. 418,413

8 Claims. (Cl. 285—81)

This invention relates to hose lines and flexible conduits, and has as an object to provide an improved construction of means constituting a coupling whereby hose sections may be quickly and efficiently interconnected and operatively associated with service outlets and facilities.

A further object of the invention is to provide an improved hose coupling of a type wherein the pressure acting interiorly of a hose is utilized to positively lock together the interengageable elements of the coupling.

A further object of the invention is to provide an improved hose coupling wherein positive operative interengagement of the coupling elements may be simply, rapidly, and efficiently accomplished through a direct telescoping action, and without the use of tools.

A further object of the invention is to provide an improved hose coupling which facilitates repetitious engagement and disengagement of its elements.

A further object of the invention is to provide an improved hose coupling efficiently adaptable for use with hose lines and like conduits arranged to transmit fluids of various types under conditions of high pressure.

A further object of the invention is to provide an improved hose coupling susceptible of development as an integral part of a hose line, or as a supplemental connector unit for selective association with conventional hose lines.

My invention consists in the construction, arrangement, and combination of elements hereinafter set forth, pointed out in my claims, and illustrated by the accompanying drawing, in which—

Figure 1:
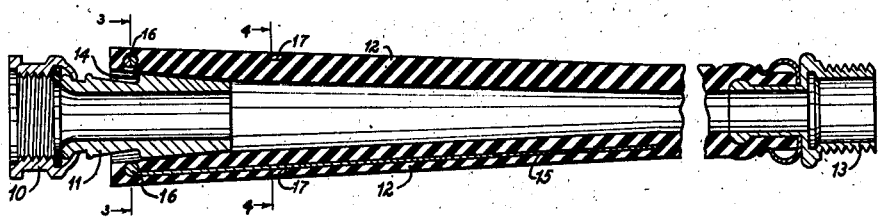
Figure 2:
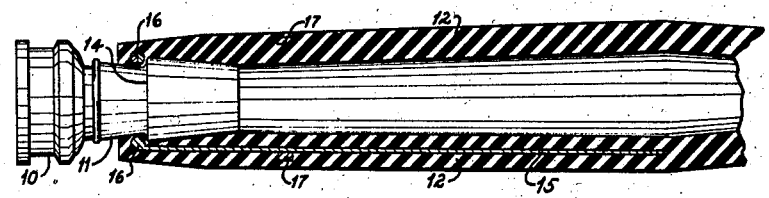
Figure 3:
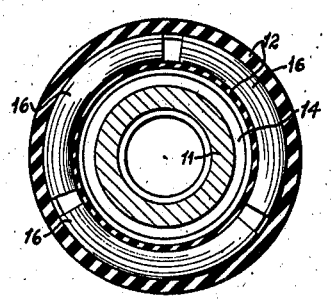
Figure 4:
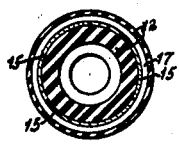

Figure 1 is a section axially and longitudinally of a hose line and associated connections constructed in accordance with the principles of my invention, intermediate portions of the hose line being broken away to conserve space and the interengageable elements of the construction being shown as initially positioned in the absence of pressure acting through the hose. Figure 2 is a view similar to Figure 1 and illustrating the relative positions assumed by the coupling elements under the influence of pressure acting through the hose. Figure 3 is a cross section, on an enlarged scale, taken on the indicated line 3—3 of Figure 1. Figure 4 is a cross section taken on the indicated line 4—4 of Figure 1.

As hereinabove suggested, the invention is susceptible of a wide variety of adaptations in the formation of an intermediate connection as an integral part of a fluid supply line. The concrete exemplification illustrated exhibits the utilization of the principles of the invention to form a connection between a source of fluid supply and an outlet nipple, which may be associated directly with a nozzle, or with an additional length of hose or pipe.

The embodiment of the invention illustrated includes an inlet nipple 10, associated with a special form of connector 11, which in turn is associated with an expansible tubular member 12, attached to an outlet nipple 13, the elements being arranged and associated to furnish a continuous passageway, permitting fluid received into said inlet nipple to pass through said connector and said tube, and into said outlet nipple for discharge therefrom. Outlet nipple 13 is threaded exteriorly, so that it may be received by a female fitting, which may be a part of a nozzle of conventional design, or may be part of a pipe or hose for further transmission of the fluid. Tube 12 is so constructed and associated with the other elements that, when said tube is subjected to pressure acting interiorly thereof, occasioned by fluid flowing therethrough, said tube expands and thereby brings into interengagement certain elements to firmly lock together said tube and connector 11, thereby preventing the expulsion of said connector from its position in relation to said tube, and also preventing the escape of fluid between the walls of said tube and connector, all as will more clearly appear in connection with the detailed description of the associated elements.

Tube 12 may be substantially in the form of a hollow cylinder, and may be formed of rubber or other suitable material adapted to serve as a conduit for the passage of water, or whatever particular fluid may be desired in a given case. As will hereinafter more fully appear, it is important that said tube be of material and construction such that it is radially expansible upon the application of interior pressure, in order to bring into proper cooperative relationship the locking elements effectuating the result hereinafter more fully mentioned.

Tube 12 receives, at its forward extremity, a portion of connector 11, which is in firm and leak proof connection with nipple 10, adapted to receive and transmit through the bore of connector 11 a supply of fluid from a desired source; for connection of nipple 10 and a pipe, hose or other conduit, any convenient means may be used, that illustrated exhibiting an interiorly threaded female fitting.

A longitudinal portion of connector 11 forward of nipple 10 is received within tube 12, the inner surface of the wall of tube 12 and the outer surface of the wall of the rear portion of connector 11 being closely fitting. The forward portion of the outer wall of nozzle 11 may be enlarged, so as to taper slightly forward, the rear portion of said enlargement being such as to form an annular abutment or shoulder 14, intermediate said enlargement and inlet nipple 10. In practice the connector is inserted sufficiently far into tube 12 that this shoulder is somewhat forward of the rear extremity of tube 12, in order that suitable interengagement of elements may take place upon the occurrence of pressure interiorly of tube 12, locking said connector and tube, as hereinafter described in detail.

In order that such locking may be effectuated, and in order that the inner wall surface of tube 12 and the enlarged outer wall surface of connector 11 may be held in intimate and leakproof relation when pressure exists interiorly of tube 12, there is provided a plurality of fingers 15, embedded with the wall of tube 12. These fingers consist of relatively long, transversely arcuate strips of any suitable, substantially rigid material, such as steel or brass. Said fingers are preferably three in number, and extend longitudinally of and within the wall of tube 12; the arcuate portion of each is preferably slightly less than 120 degrees, so that when in place the three together form, in effect, a hollow cylinder, coaxial with tube 12, but having three longitudinal slots parallel with the axis, as more clearly appears from Figure 4. Each finger is provided with a flange 16 at its forward extremity, extending toward the axis, for interengagement with shoulder 14 upon the application of pressure within tube 12. The three flanges, however, lie in different planes perpendicular to the axis of tube 12, so that when said flanges are thrust radially toward such axis, in the manner hereinafter mentioned, they may overlap, in order that the connection between tube 12 and connector 11 may be tight and leakproof.

In order to afford the necessary coaction between flanges 16 and shoulder 14, a fulcrum ring 17 is employed, which may be and preferably is embedded in the wall of tube 12, and which extends circumferentially of and in coaxial relation with said tube, encircling fingers 15 in close adjacency therewith. Ring 17 is circumferentially continuous, and is formed of any suitable substantially rigid material, such as brass or steel.

It is readily apparent that when a fluid supply under pressure is admitted into tube 12, through nipple 10, from any suitable source, while tube 12 and associated elements are in the relationship exhibited by Figure 1, the fluid pressure will cause the wall of tube 12 to expand, thereby thrusting the forward portion of fingers 15 radially outward. Thus ring 17 serves as a fulcrum, and fingers 15 operate as levers of the first class, forcing flanges 16 radially inward, into abutting relation with shoulder 14, thereby cramping nipple 10 and holding it securely in place, and also sealing the wall of tube 12 against the rear portion of the outer wall of connector 11 and preventing the escape of fluid between said walls. Under such pressure the elements of the assembly assume the relationship indicated in Figure 2. When the pressure ceases, upon cutting off the fluid supply, the elements will again assume the relationship indicated in Figure 1, and connector 11 may be easily removed.

It will thus be seen that connector 11 is readily removable and replaceable under non-operating conditions, but will be retained firmly in place and function effectively when the device is employed for the passage of fluid under pressure through tube 12 for discharge by means of outlet nipple 13. It will further be apparent that the assembly illustrated may serve in a variety of ways in the transmission of fluids, either as an intermediate connection in a long fluid transmission line or as a terminal portion for the discharge of fluid through nipple 13 and a conventional nozzle attached thereto.

Since many changes, variations, and modifications in the specific form, construction and arrangement of the elements shown and described may be had without departing from the spirit of my invention, I wish to be understood as being limited solely by the scope of the appended claims, rather than by any details of the illustrative showing and foregoing description.

I claim as my invention:

1. In a device of the character described, a hollow connector for the passage of fluid, a tube associated with said connector to receive fluid therefrom, and radially-movable, rigid lever means associated with said tube operable by pressure developed internally of said tube by the passage of said fluid therethrough to lock said tube to said connector.

2. A fluid supply line, comprising a source of fluid, a connector and a tube associated with said source of fluid and with each other to form a passageway for said fluid, and means to lock said connector and tube, comprising radially-movable, rigid lever means associated with said tube and operable by pressure developed internally of said tube by the passage of fluid therethrough.

3. In a device of the character described, comprising a connector adapted for the reception and transmission of fluid into a tube in telescoping relation with said connector, means to lock said tube and connector, comprising lever and fulcrum means to cramp the wall of said tube against the wall of said connector and operable by pressure developed internally of said tube by the passage of fluid therethrough.

4. In a device of the character described, including a connector adapted for the reception and transmission of fluid into a tube having an extremity in surrounding relation with said connector, an annular shoulder on said connector, fingers having an extremity in surrounding relation with said shoulder and adapted to be thrust adjacent said shoulder to lock with said connector, and a radially expansible wall comprising a longitudinal portion of said tube and adapted to be expanded radially by pressure developed within said tube by the passage of fluid therethrough to thrust said flanges radially inward to lock said tube and connector.

5. In combination with a connector adapted for the reception and transmission of fluid into a tube having an extremity in surrounding relation with said connector, an annular shoulder on said connector, fingers forming a part of the wall of said tube, flanges on said fingers adjacent and rearward of said shoulder, a fulcrum ring forming a part of the wall of said tube and positioned forward of said shoulder and intermediate the extremities of said fingers, and a radially expansible wall comprising a longitudinal portion of said tube and adapted to be expanded radially by pressure developed within said tube by the passage of fluid therethrough to actuate said fingers as levers and thrust said flanges into locking relation with said shoulder.

6. In a device of the character described, a radially expansible tube, a connector in telescoping relation with said tube at one extremity thereof, a shoulder on said connector, fingers extending longitudinally of said tube and connector flanges on said fingers at one extremity thereof adapted to engage said shoulder upon the radial expansion of said tube by fluid pressure therein, and a fulcrum ring intermediate said flanges and the remote extremity of said fingers surrounding said fingers.

7. In a device of the character described, including a radially expansible tube in telescopic relation with a connector adapted to receive and transmit fluid into said tube, fingers extending longitudinally of said tube and adapted to lock said tube and connector upon the radial expansion of said tube upon the development of pressure within said tube.

8. In a device of the character described, including a radially expansible tube in telescopic relation with a connector adapted to receive and transmit fluid into said tube, and fingers extending longitudinally of said tube and adapted to lock said tube and connector by the radially inward thrust of one extremity of said fingers, a fulcrum ring surrounding said fingers intermediate their extremities.

DONALD S. ROGERS.